Dec. 22, 1925.

H. G. LARSEN 1,566,609

ROLLER FOR ROLLER SKATES

Filed Oct. 10, 1924

Inventor:
Hans G. Larsen,
by Robert Burns
Atty.

Patented Dec. 22, 1925.

1,566,609

UNITED STATES PATENT OFFICE.

HANS G. LARSEN, OF CHICAGO, ILLINOIS.

ROLLER FOR ROLLER SKATES.

Application filed October 10, 1924. Serial No. 742,820.

*To all whom it may concern:*

Be it known that I, HANS G. LARSEN, a citizen of the United States of America, and a resident of Chicago, in the county of Cook and State of Illinois, have invented a certain new and useful Improvement in Rollers for Roller Skates, of which the following is a specification.

This invention relates to rollers or wheels for roller skates and like articles, and has for its object:—

To provide a structural formation and combination of parts, whereby a very effective resiliency is attained in the roller structure, and with which transmission of the ordinary vibration and jar in actual use from the rigid roller tread member to the person of the user is effectively prevented, which at the same time ample stability in the structure is maintained, all as will hereinafter more fully appear. In the accompanying drawing.

Like reference numerals indicate like parts in the different views.

Figure 1:
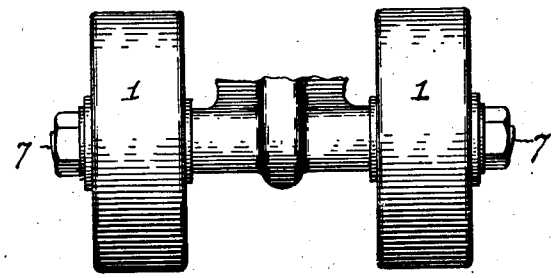
Fig. 1, is an end view of a pair of roller skate wheels or rollers embodying the present invention.
Figure 2:
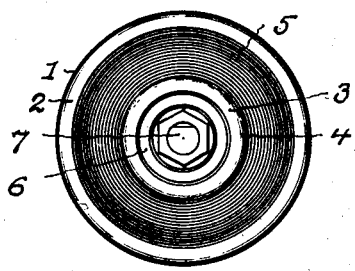
Fig. 2, is a side elevation.
Figure 3:
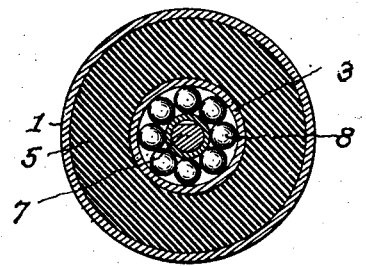
Fig. 3, is a transverse section on line 3—3 Fig. 4.
Figure 4:
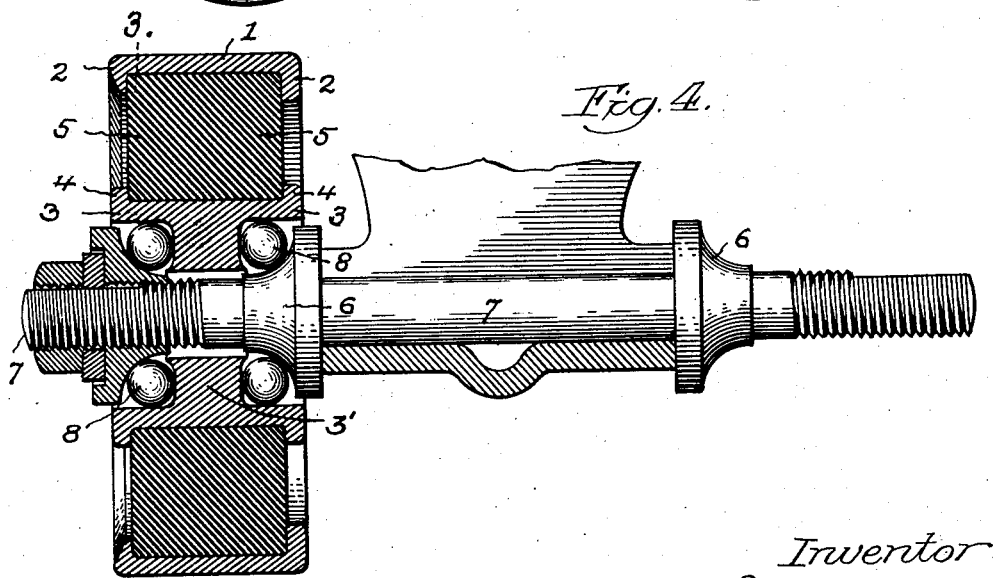
Fig. 4, is an enlarged detail axial section.

In the present wheel or roller structure, the annular rim or tread member 1 is of a plate form, of metal or like rigid material, having inturned annular holding flanges 2 at its respective margins. In like manner the central hub 3 of metal or like rigid material is formed with annular collars 4, complementary to the flanges 2 of the rim or tread 1, with said flanges 2 and collars 4 forming holding channels for reception of the annular intermediate wheel portion 5 formed of semi-elastic material, such as india rubber, which is pressed into position and with the parts held in assembled relation by said flanges 2 and collars 4, as illustrated in Fig. 4.

A material feature of the present improvement involves an inner annular collar 3' integrally formed at the mid-length of the bore of the hub 3, and serving the main function of imparting a desired rigidity and strength in the hub, and the auxiliary function of providing in conjunction with cylindrical bore of said hub a pair of circular tracks or races for the series of balls 8 which are arranged between said tracks or races and a pair of cones 6 on the carrying axle 7, to constitute a ball bearing mount for the wheel of a roller skate.

Having thus fully described my invention what I claim and desire to secure by Letters Patent, is:—

In a roller for roller skates and the like, the combination of a rigid tread member of a plate form having inturned holding flanges at its respective margins, a hub member formed with peripheral holding collars complementary to the inturned flanges of the tread member and with an inner annular collar mid-way the length of its bore, and a semi-elastic intermediate member held in place solely by said flanges and collars.

Signed at Chicago, Illinois, this 9th day of October, 1924.

HANS G. LARSEN.